(12) United States Patent
Miyoshi

(10) Patent No.: US 7,047,044 B2
(45) Date of Patent: May 16, 2006

(54) RADIO RECEIVING DEVICE AND RADIO RECEIVING METHOD

(75) Inventor: Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 947 days.

(21) Appl. No.: 09/936,728

(22) PCT Filed: Jan. 17, 2001

(86) PCT No.: PCT/JP01/00250

§ 371 (c)(1),
(2), (4) Date: Sep. 17, 2001

(87) PCT Pub. No.: WO01/54310

PCT Pub. Date: Jul. 26, 2001

(65) Prior Publication Data

US 2003/0069045 A1 Apr. 10, 2003

(30) Foreign Application Priority Data

Jan. 19, 2000 (JP) ............................. 2000-010878

(51) Int. Cl.
*H04B 1/38* (2006.01)

(52) U.S. Cl. ............... 455/562; 455/561; 455/277.1; 455/277.2; 455/101; 455/83; 455/63; 455/67.1

(58) Field of Classification Search ............... 455/296, 455/63, 67.1, 83, 101, 277.1, 277.2, 561, 455/562; 342/378, 383, 380

See application file for complete search history.

(56) References Cited

U.S. PATENT DOCUMENTS

| | | | | |
|---|---|---|---|---|
| 6,064,338 A | * | 5/2000 | Kobayakawa et al. | 342/378 |
| 6,385,185 B1 | * | 5/2002 | Huang | 370/342 |
| 6,526,271 B1 | * | 2/2003 | Uesugi et al. | 455/296 |

FOREIGN PATENT DOCUMENTS

| | | |
|---|---|---|
| EP | 0930727 A2 | 7/1999 |
| JP | 10190495 | 7/1998 |
| JP | 11205286 | 7/1999 |
| JP | 11251959 | 9/1999 |
| JP | 2000-138605 | 5/2000 |
| JP | 2000138605 | 5/2000 |
| JP | 2001-016148 | 1/2001 |
| JP | 2001016148 | 1/2001 |

OTHER PUBLICATIONS

Chinese Office Action dated Mar. 28, 2003 with English translation.
International Search Report dated Apr. 3, 2001.

* cited by examiner

*Primary Examiner*—Allan Hoosain
(74) *Attorney, Agent, or Firm*—Stevens, Davis, Miller & Mosher, LLP

(57) ABSTRACT

A reception weight calculation section 203 calculates reception weights $W_1$ and $W_2$ every antenna using an optimal directional control method in order to improve interference cancellation effect, an arrival direction estimation section 204 estimates a direction of arrive of a received signal for each antenna to calculate steering vectors $S_1$ and $S_2$ for each antenna, and a replica weight calculation section 211 calculates replica weights $W_{r1}$ and $W_{r2}$ using the reception weights $W_1$, $W_2$ and steering vectors $S_1$, $S_2$.

9 Claims, 7 Drawing Sheets

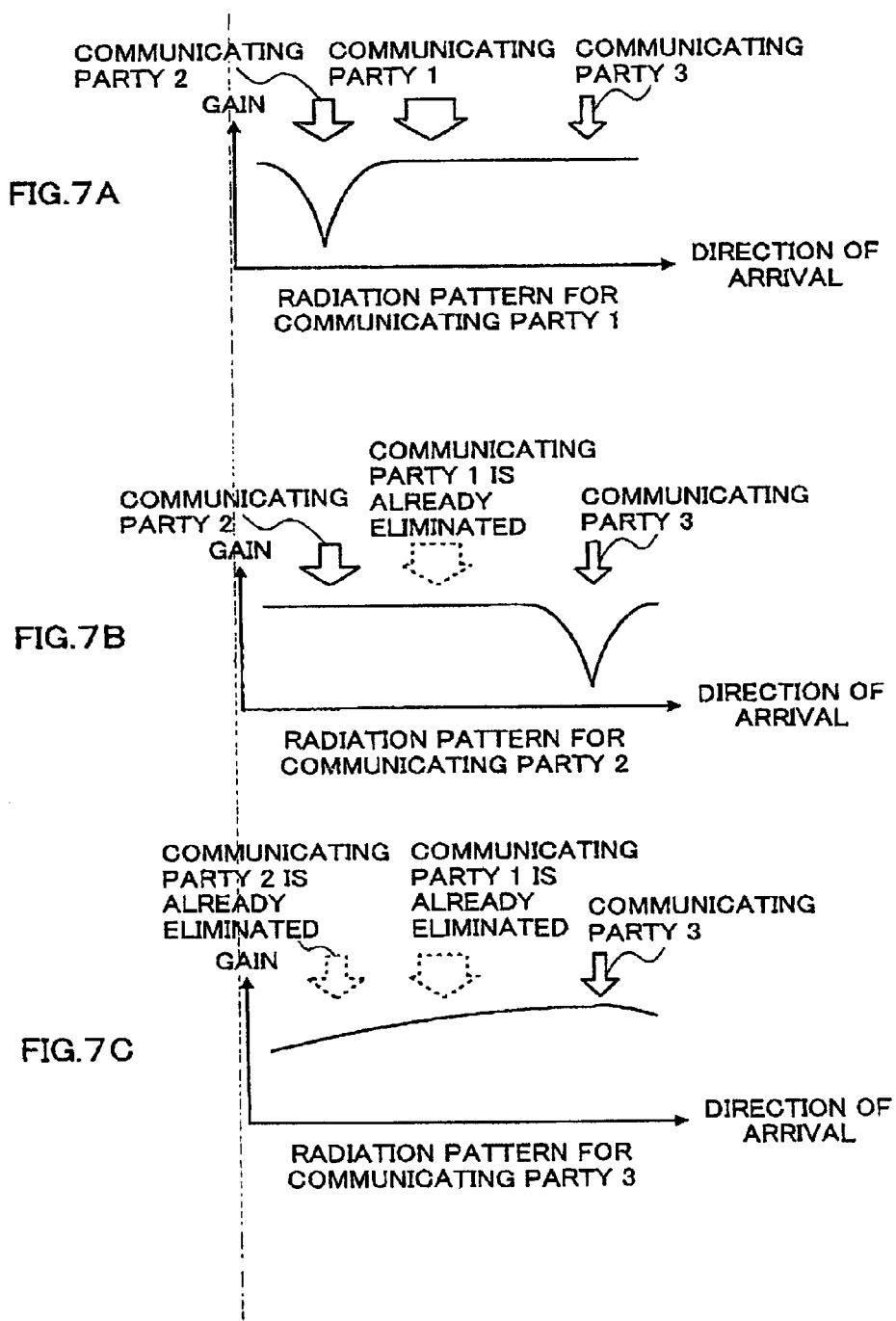

RADIO RECEIVING DEVICE AND RADIO RECEIVING METHOD

TECHNICAL FIELD

The present invention relates to a radio receiving apparatus and a radio receiving method used in a mobile communication system of CDMA (Code Division Multiple Access).

BACKGROUND ART

In a mobile communication system of CDMA, since a plurality of user signals is transmitted in the same band, a signal that a radio receiving apparatus receives is subjected to interference by various signals to cause deterioration of characteristics.

An array antenna is known as an apparatus for eliminating the interference. The array antenna is composed of a plurality of antenna elements, and is capable of setting reception directivity freely by providing adjustment of each of amplitude and phase to a signal received by each antenna element. In this case, adjustment of amplitude and phase provided to the received signal can be carried out by multiplying the received signal by weighting factor (hereinafter referred to as "reception weight"). The radio receiving apparatus can intensively receive only a signal coming from a desired direction by adjusting the reception weight by which the received signal is multiplied.

Another apparatus for eliminating the interference, an interference canceller is known. The interference canceller is a technique for canceling a signal (interference) transmitted from other communication partners other than current communication partner from the received signal to extract a desired signal from the received signal. Conventionally, as an apparatus for canceling interference signals, there are apparatuses described in 1) "Sequential Channel Estimation Type Serial Canceller Using a pilot Symbol in DS-CDMA (Technical Bulletin, RCS95-50, July 1995, Radio Communication System Research Society of the Institute of Electronics, Information and Communication Engineers)" authored by Sawahashi, Miki, Andoh, and Higuchi, 2) "Sequential Transmission Line Estimation Type CDMA Multistage Interference Canceller Utilizing a Symbol Replica Process (Technical Bulletin, RCS96-171, February, 1997, Radio Communication System Research Society of the Institute of Electronics, Information and Communication Engineers)" authored by Yoshida and Ushirokawa, and 3) "Study of CDMA Interferences Canceller in an Upstream Line(Technical Bulletin, RCS96-121, January, 1997, Radio Communication System Research Society of the Institute of Electronics, Information and Communication Engineers)" written by Uosugi, Katch, and Honma. The above three apparatuses are hereinafter referred to as 1) a serial type interference canceller, 2) a parallel type interference canceller, and 3) a symbol ranking type canceller.

Here, it can be expected that the use of combination of the array antenna and the interference canceller provide a larger interference cancellation effect than each independent use.

However, in the radio communication system that provides reception directivity to each channel corresponding to each communication partner by use of the array antenna, degree of interference with respect to each communication partner is different from one communication partner to another. Accordingly, in the case of applying the interference canceller to such the system, it is necessary to individually provide the interference canceller to each channel corresponding to each communication partner. Hence, the simple combination of the array antenna and the interference canceller increases the amount of calculations and the apparatus scale, making it difficult to implement such an apparatus in consideration given to actual hardware design.

DISCLOSURE OF INVENTION

It is an object of the present invention is to provide a radio receiving apparatus and a radio receiving method that are capable of receiving a desired signal with high quality in an apparatus of small scale without providing an interference canceller to each channel corresponding to each communication partner even when the array antenna and the interference canceller are combined.

In order to attain the above object, the present invention generates a replica signal every signal received by each antenna of the array antenna to make it possible to receive a desired signal with high quality in an apparatus of small scale without providing an interference canceller to each channel corresponding to each communication partner even when the array antenna and the interference canceller are combined.

Particularly, the present invention is characterized in that a reception weight by which an optimal radiation pattern is formed is calculated to improve an interference cancellation effect without limiting to a calculation algorithm of the reception weight. Moreover, the present invention is characterized in that the reception weight is sequentially updated using a signal from which a interference signal is sequentially eliminated to sequentially generate a radiation pattern with high reliability, whereby further improving the interference cancellation effect.

BRIEF DESCRIPTION OF THE DRAWINGS

FIG. 7A is a view showing one example of a radiation pattern formed by each ICU of the radio receiving apparatus according to Embodiment 2 of the present invention;

FIG. 7B is a view showing one example of a radiation pattern formed by each ICU of the radio receiving apparatus according to Embodiment 2 of the present invention; and FIG. 7C is a view showing one example of a radiation pattern formed by each ICU of the radio receiving apparatus according to Embodiment 2 of the present invention.

BEST MODE FOR CARRYING OUT THE INVENTION

Embodiments of the present invention will be specifically described with reference to the drawings accompanying herewith.

Embodiment 1

Figure 1:
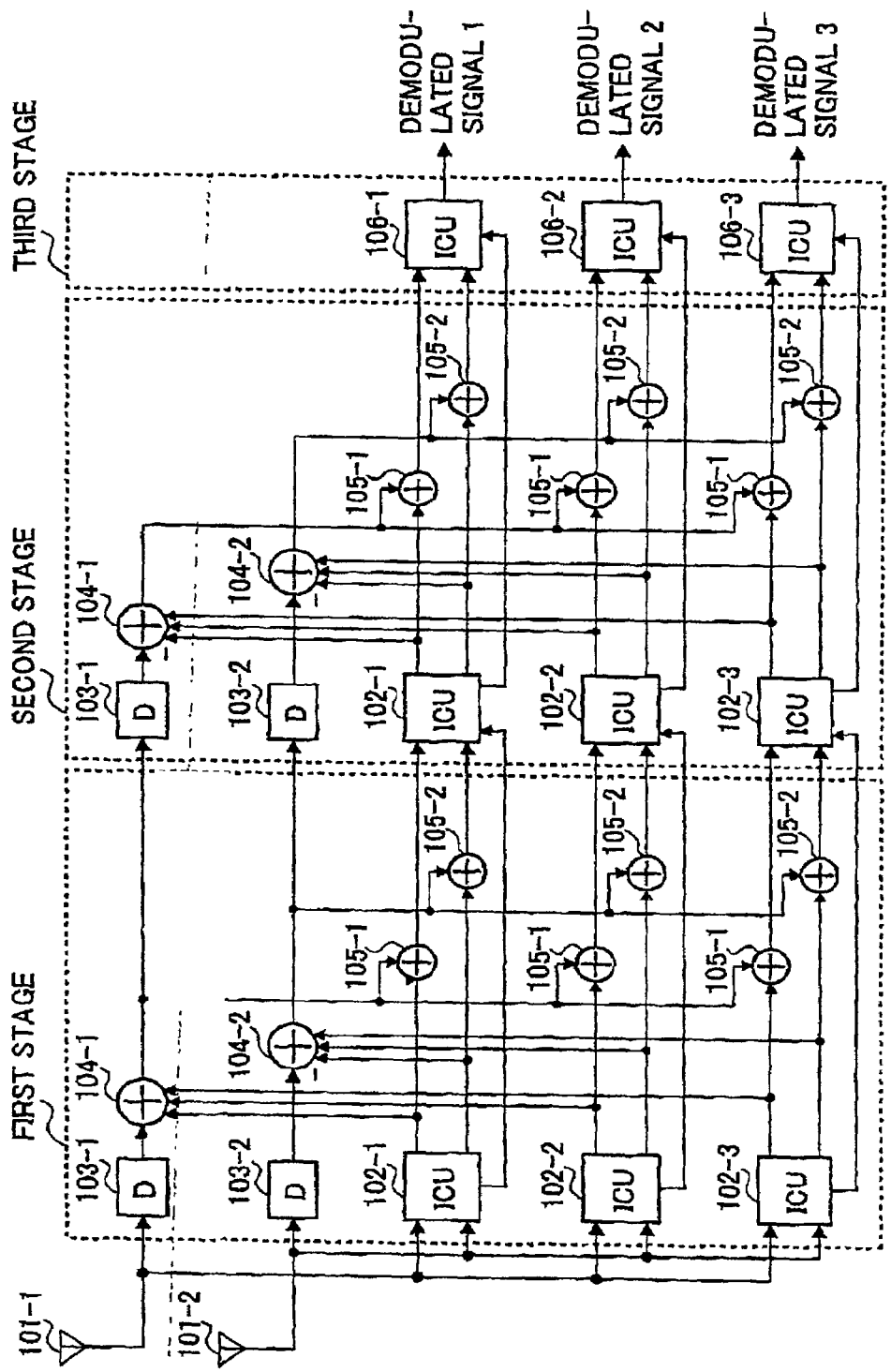
FIG. 1 is a block diagram of a main part illustrating a schematic configuration of a radio receiving apparatus according to Embodiment 1 of the present invention.

FIG. 1 is a block diagram of a main part illustrating a schematic configuration of a radio receiving apparatus according to Embodiment 1 of the present invention. The following will explain the case in which the number of stages of the interference canceller is 3, the number of communication partners is 3, and the number of multipaths is 3. It is noted that these numbers are just one example, and this Embodiment is not limited to these number.

In addition, as illustrated in FIG. 1, since the first stage and the second stage have the same configuration, the same reference numerals are added to the same structural parts, and the explanation of the second stage is omitted.

In FIG. 1, a signal received via an antenna 101-1 is inputted to ICUs (Interference Canceling Units) 102-1 to 102-3 and a delayer 103-1 provided to correspond to the antenna 101-1. similarly, a signal received via an antenna 101-2 is inputted to ICUs 102-1 to 102-3 and a delayer 103-2 provided to correspond to the antenna 101-2.

ICUs 102-1 to 102-3 are provided to correspond to communication partners 1 to 3, respectively, and each generates a replica signal in connection with each of the signals received via the antennas 101-1 and 101-2. The replica signals generated by the ICUs 102-1 to 102-3 are inputted to adders 104-1 and 104-2 provided to correspond to the antennas 101-1 and 101-2, and are inputted to adders 105-1 and 105-2. The configuration of each of the ICUs 102-1 to 102-3 will be described later.

The delayers 103-1 and 103-2 delay the received signals by processing time of ICUs 102-1 to 102-3, and each outputs the resultant to each of the adders 104-1 and 104-2.

In the adder 104-1, the replica signals of communication partners 1 to 3 for the signal received via the antenna 101-1 are subtracted from the signal received via the antenna 101-1. Also, in the adder 104-2, the replica signals of communication partners 1 to 3 for the signal received via the antenna 101-2 are subtracted from the signal received via the antenna 101-2. This eliminates the replica signals of all communication partners from the signals received via the respective antennas. Signals (residual signals) obtained by eliminating the replica signals of all communication partners from the received signals are inputted to the adders 105-1 and 105-2, respectively, and are inputted to the delayers 103-1 and 103-2 of the second stage.

In the adders 105-1 and 105-2, the replica signals for the signals received via the antennas 101-1 and 101-2 and the residual signals are added every communication partner. This eliminates the replica signal of communication partner 1, the replica signal of communication partner 2, the replica signal of communication partner 3 from the received signals every antenna. Namely, when attention is paid to communication partner 1, the signal from communication partner 2 and the signal from communication partner 3, which cause interference with communication partner 1, are eliminated from the received signal to obtain a desired signal for communication partner 1 every antenna. The similar processing is carried out, so that the signals of other communication partners causing interference are eliminated from the received signals, so that the desired signal for communication partner 2 and the desired signal for communication partner 3 can be obtained every antenna. The obtained desired signals are inputted to ICUs 102-1 to 102-3 of the second stage, respectively.

According to the radio receiving apparatus of this embodiment, the same processing as performed in the first: stage is repeated in the second stage, so that the accuracy of replica signal is improved and that of the interference signal cancellation is improved. In other words, the more the number of stages are increased, the more the inference signals sent from the other communication partners that cause interference with the respective communication partners are eliminated.

The signals added by the adders 105-1 and 105-2 of the second stage are inputted to ICUs 106-1 to 106-3 of the third stage, and are demodulated. This obtains demodulated signals 1 to 3 of the communication partners 1 to 3. The configuration of each of the ICUs 106-1 to 106-3 will be described later.

Figure 2:
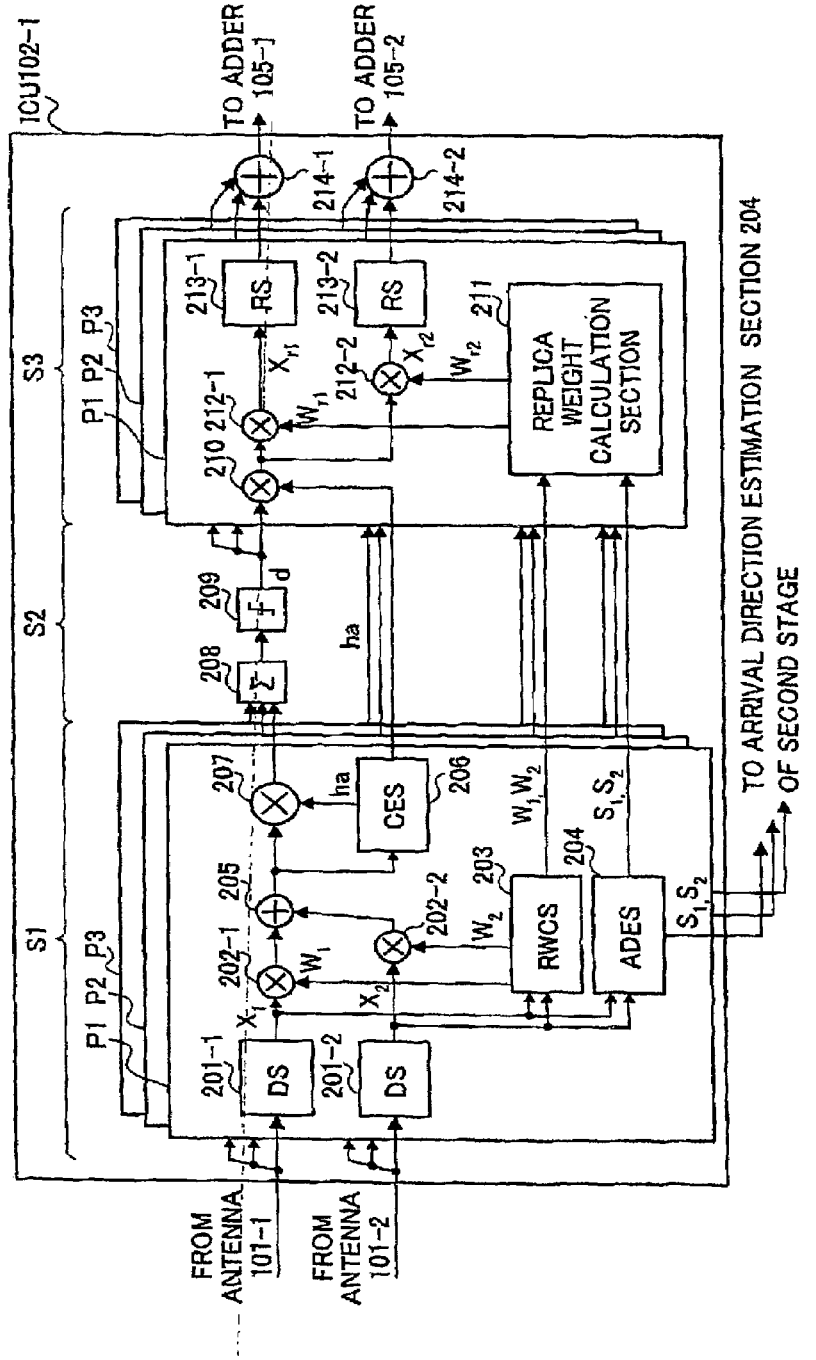
FIG. 2 is a block diagram of a main part illustrating a schematic configuration of ICU of each of first and second stages of an interference signal canceling apparatus according to Embodiment 1 of the present invention.
Figure 3:
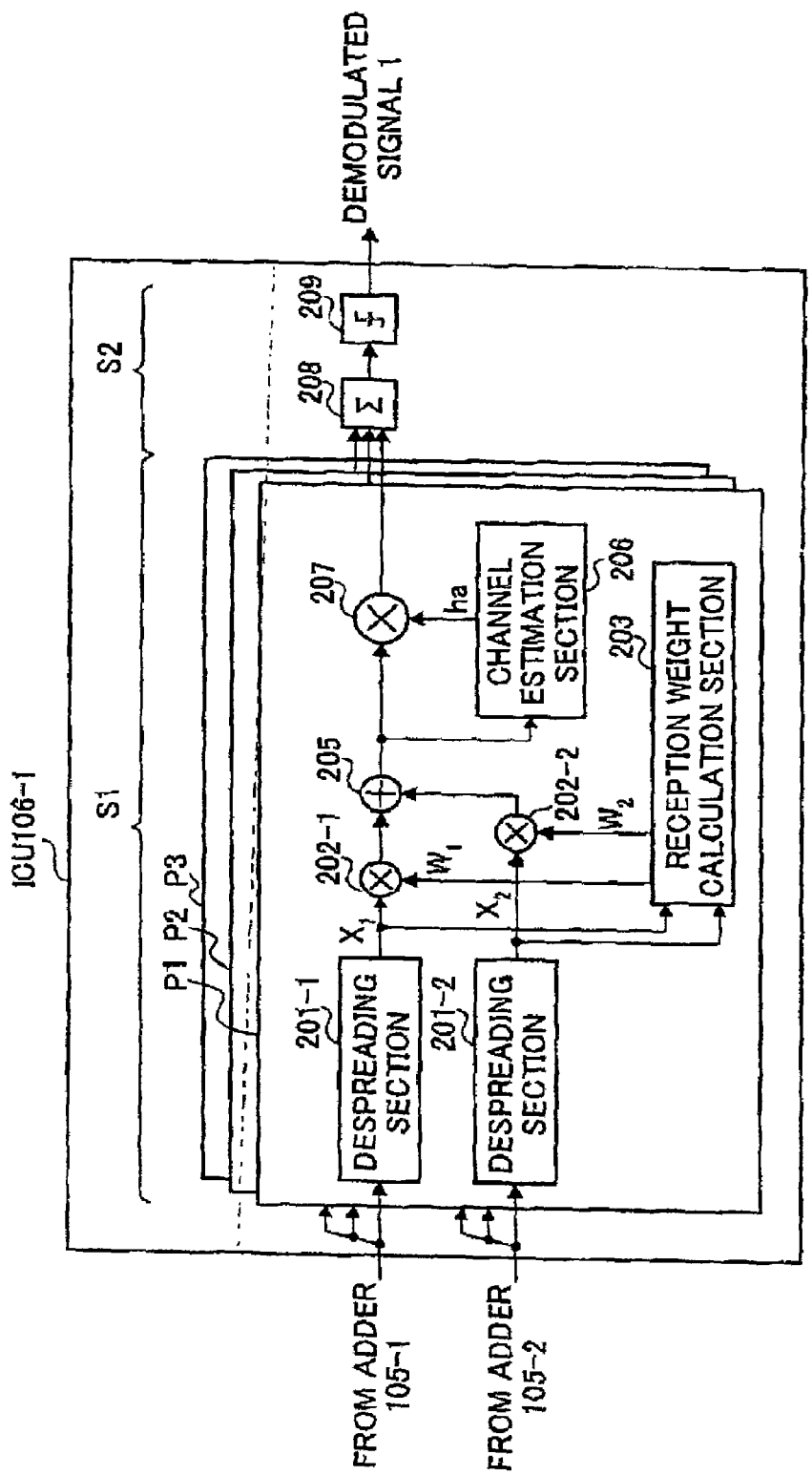
FIG. 3 is a block diagram of a main part illustrating a schematic configuration of ICU of a third stage of the interference signal canceling apparatus according to Embodiment 1 of the present invention.

An explanation will be next given of ICUs 102-1 to 102-3 and ICUs 106-1 to 106-3. FIG. 2 is a block diagram of a main part illustrating a schematic configuration of ICU of each of first and second stages of an interference signal canceling apparatus according to Embodiment 1 of the present invention. Also, FIG. 3 is a block diagram of a main part illustrating a schematic configuration of ICU of a third stage of the interference signal canceling apparatus according to Embodiment 1 of the present invention. Additionally, ICUs 102-1 to 102-3 of the first and second stages have the same configuration and operation, respectively. Also, ICUs 106-1 to 106-3 of the third stage have the same configuration and operation. Accordingly, in the explanation set forth below, the ICU 102-1 of the first stage and the ICU 106-1 of the third stage corresponding to the communication partner 1 are explained, and the explanation of the respective ICUs corresponding to the communication partner 2 and the communication partner 3 is omitted. Moreover, the ICU 102-1 shown in FIG. 2 and the ICU 106-1 shown in FIG. 3 are configured on the assumption that the number of multipath to the radio receiving apparatus is 3. In FIGS. 2 and 3, the respective configuration parts for the respective paths are shown by P1 to P3, respectively. Since the respective configuration parts for the respective paths have the same configuration and operation, only the first path P1 is illustrated, and the explanation of the second path P2 and third path P3 is omitted.

In FIG. 2, the ICU 102-1 briefly includes a preceding stage S1 in which the signals received by the respective antennas 101-1 and 101-2 are subjected to despreading and then the resultants are multiplied by reception weights of the receptive antennas, respectively, an intermediate stage S2 in which RAKE combining and provisional decision are carried out, and the last stage S3 in which the signal subjected to provisional decision is multiplied by a weighting factor for generating a replica signal (hereinafter referred to as "replica weight") to generate a replica signal.

The signal received via the antenna 101-1 is despread by a despreading section 201-1 and the signal received via the antenna 101-2 is despread by a despreading section 201-2. Despread signals $X_1$ and $X_2$ are inputted to multipliers 202-1, 202-2, a reception weight calculation section 203, and an arrival direction estimation section 204.

The reception weight calculation section 203 calculates weights $W_1$ and $W_2$ of each antenna, and outputs the resultants to multipliers 202-1 and 202-2, and a replica weight calculation section 211. Since the reception weight calculation section 203 is provided every path and every communication partner, making it possible to calculate the reception weights each being different every path and every user. The calculation method for the reception weight will be described later.

The arrival direction estimation section 204 estimates a direction of arrival of the received signal every antenna, and outputs steering vectors $S_1$ and $S_2$ of the respective antennas to the replica weight calculation section 211, and the arrival direction estimation section 204 of the second stage Here, the reason why the arrival direction estimation section 204 of the first stage outputs the steering vectors $S_1$ and $S_2$ to the arrival direction estimation section 204 of the second stage is as follows. Specifically, the arrival direction estimation section 204 of the second stage averages the steering victors calculated in the first stage and the steering victors calculated in the second stage every path, and uses the resultant as a steering vector in the second stage. This makes it possible to increase the accuracy of the steering vector as the operation goes to the last stage. In other words, the accuracy of the direction of arrival can be improved as the operation goes to the last stage, making it possible to improve the accuracy of the calculation of the replica weight.

Here, since the signal inputted to each stage is a signal from which an interference signal is eliminated in the previous stage, the signal whose interference state changes every stage is inputted. Hence, according to this embodiment, the reception weight calculation section 203 and the arrival direction estimation section 204 are provided on a stage-by-stage basis. This makes it possible to adaptively change the radiation pattern in accordance with the state of the inference signal at this point on the stage-by-stage basis. Hence, according to this embodiment, the radiation pattern and the replica signal can be accurately generated This eliminates the useless processing wherein interference cancellation using directional control is further performed to interference that can be sufficiently cancelled by only interference cancellation processing, conversely; interference cancellation processing is further performed to interference that can be sufficiently cancelled by only directional control.

Moreover, according to this embodiment, the direction of arrival of the signal from which the interference signals are sequentially cancelled is estimated. Hence, the accuracy of estimation of the direction of arrival is improved as the operation goes to the last stage. Accordingly, since the interference cancellation having good performance can be carried out with a relatively small number of stages, the apparatus scale can be reduced.

Despread signals $X_1$ and $X_2$ are multiplied by reception weights $W_1$ and $W_2$ by the multipliers 202-1 and 202-2, respectively, and the resultant is added by an adder 205. This carries out array combining. The signal subjected to array combining is outputted to a channel estimation section 206 and is outputted to a multiplier 207.

The channel estimation section 206 performs the channel estimation based on the signal subjected to the array combining, and outputs the resultant to a complex conjugate $h_a^*$ of a channel estimation value $h_a$ to the multiplier 207, and outputs the channel estimation value $h_a$ to a multiplier 210. The multiplier 207 multiplies the signal subjected to the array combining by the complex conjugate $h_a^*$ of the channel estimation value. This compensates for phase rotation of the signal subjected to the array combining.

The signal, which has been subjected to the array combining of each of paths P1 to P3 and which has been multiplied by the complex conjugate $h_a^*$ of the channel estimation value, is subjected to RAKE combining by an adder 208 of the intermediate stage S2. The result obtained by RAKE combining is temporarily decided by a decider 209. A signal d subjected to temporarily decision is multiplied by the channel estimation value $h_a$ by a multiplier 210 for each of paths P1 to P3, and the resultant is inputted to multipliers 212-1 and 212-2, respectively.

A replica weight calculation section 211 calculates replica weights $W_{r1}$ and $W_{r2}$ using reception weights $W_1$ and $W_2$ and steering vectors $S_1$ and $S_2$, and outputs the resultant to the multipliers 212-1 and 212-2, respectively. The method for calculating the replica weight will be described later.

The multipliers 212-1 and 212-2 multiply the signals outputted from the multiplier 210 by replica weights $W_{r1}$ and $W_{r2}$, respectively. This obtains replica signals $Xr_1$ and $Xr_2$ corresponding to $X_1$ and $X_2$, respectively. The replica signals $Xr_1$ and $Xr_2$ are spread by re-spreading sections 213-1 and 213-2, respectively, and the resultants are inputted to adders 214-1 and 214-2. The replica signals $Xr_1$ and $Xr_2$ re-spread for each of paths P1 to P3 are added by adders 214-1 and 214-2, respectively, and the resultants are inputted to adders 105-1 and 105-2.

Next, the ICU 106-1 of the third stage will be described. As illustrated in FIG. 3, the ICU 106-1 of the third stage has substantially the same structure al that of the preceding stage S1 and that of the intermediate stage S2 of the ICU 102-1 of FIG. 2. Accordingly, the same reference numerals are added to the same configuration parts as those of the ICU102-1 of FIG. 2, and the explanation of the ICU 106-1 of the third stage will be omitted. The ICU 106-1 is different from the ICU 102-1 in the point that there is no the arrival direction estimation section 204 provided in the ICU 102-1. This is because in the third stage, demodulated signal 1 is outputted instead of the replica signal, and therefore the replica weight necessary for generating the replica signals not required, whereby steering vector necessary for calculating the replica weight is not required also.

An explanation will be next given of the method for calculating the reception weights $W_1$ and $W_2$, and the method for calculating the replica weights $W_{r1}$ and $W_{r2}$.

The method of directional control using the array antenna is largely divided into directional control carried out by a beam steering and directional control carried out by a null steering.

The beam steering is a method in which interference from the other communication partners is eliminated by generating such a radiation pattern that directs directivity to a direction where a desired communication partner exists. On the other hand, the null steering is a method in which interference from the other communication partners is eliminated by generating a radiation pattern that forms a null point in a direction where a desired communication partner exists.

In the cease of performing array reception using the beam steering, the signals received by the respective antennas are multiplied by in-phase addition weights as reception weights $W_1$ and $W_2$ such that the signals received by the respective antennas are added in a state that they all are in phase with each other. Here, the in-phase addition weights are weights that adjust only phases of the signals received by the respective antenna. For this reason, in the case of using the in-phase addition weights as reception weights $W_1$ and $W_2$, the signals subjected to provisional decision are multiplied by complex conjugates of reception weights $W_1$ and $W_2$ as replica weights $Wr_1$ and $Wr_2$ in order to return the adjusted phases to the original. This makes it possible to generate replica signals $Xr_1$ and $Xr_2$ for each antenna.

Figure 4:
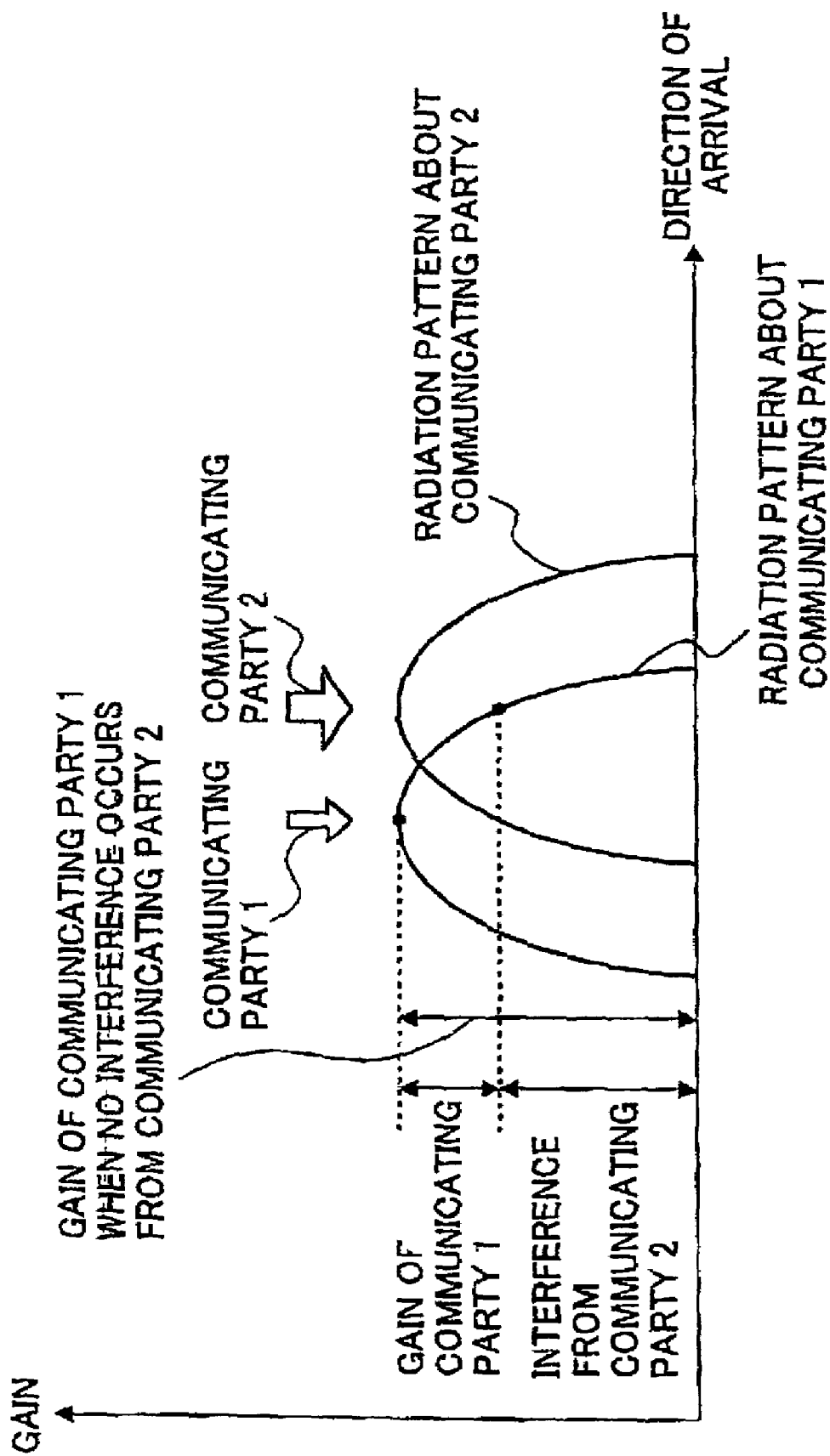
FIG. 4 is a view of a radiation pattern formed by a beam steering.

However, in the case of the beam steering (namely, in-phase addition weight), the radiation pattern is not in a pointed form as illustrated in FIG. 4. Moreover, in the case of the beam steering, control is performed in such a way that the center of the radiation pattern is directed to the direction where a desired communication partner exists. For this reason, when the direction where the desired communication partner exists and the direction where the communication partner, which causes interference, exists are close to each other or when transmission power of the communication partner, which causes interference, is greater than that of the desired communication partner, it is impossible to sufficiently eliminate interference with respect to the desired communication partner.

More specifically, as illustrated in FIG. 4, when communication partner 2 exists closely in the direction where a desired communication partner 1 exists, the signal sent from the communication partner 2 that causes interference with the communication partner 1 cannot be fully eliminated in the case of the beam steering. For this reason, the gain of the desired communication partner 1 becomes extremely small as compared with the case in which there is no interference from the communication partner 2.

Figure 5:
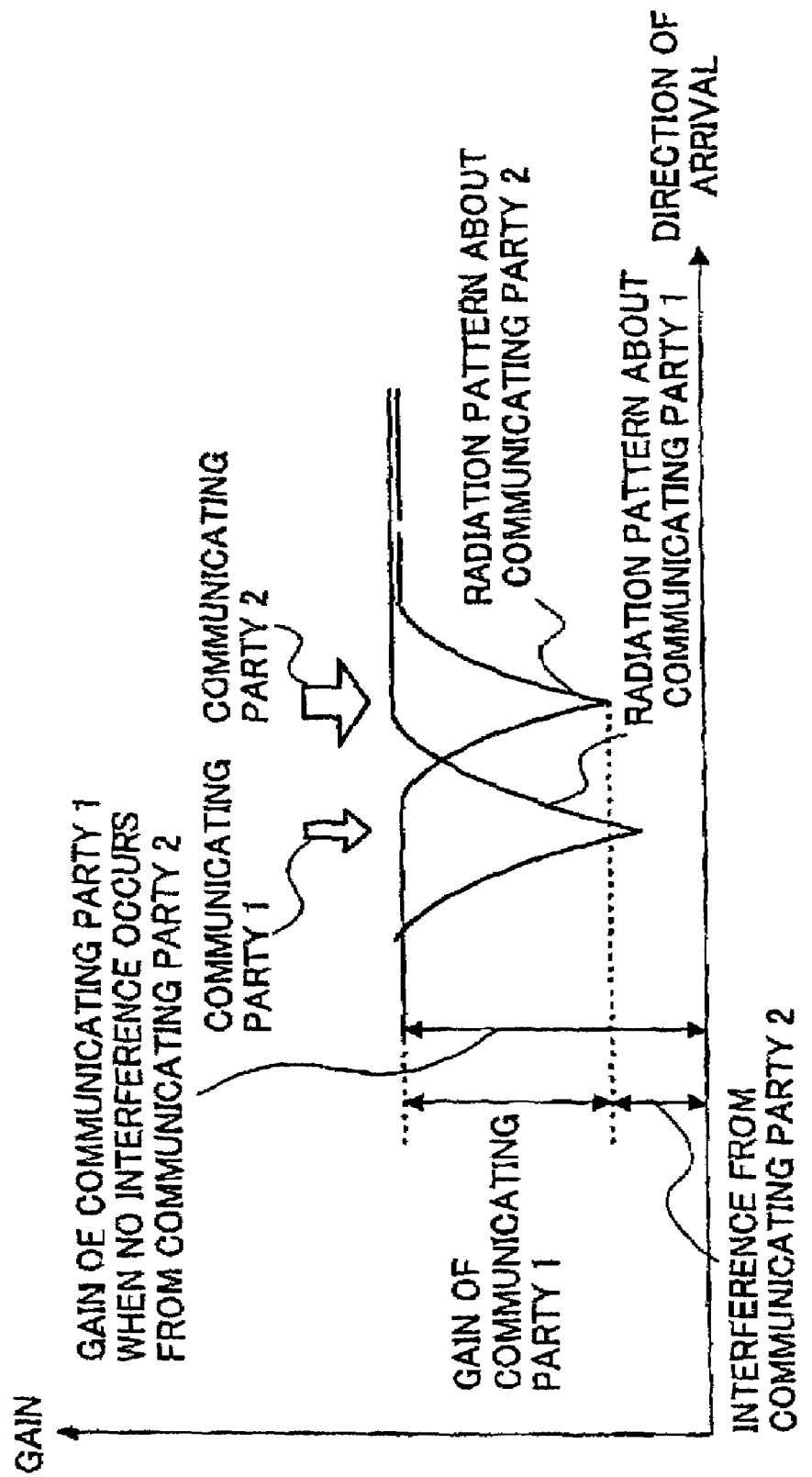
FIG. 5 is a view of a radiation pattern formed by a null steering.

On the other hand, in the case of the null steering, such a radiation pattern that directs the null point to the direction, where the communication partner 2 that causes interference exists, is formed in connection with the desired communication partner 1 as illustrated in FIG. 5. This makes it possible to fully eliminate the signal sent from the communication partner 2 that causes interference with the communication partner 1. As a result, the gain of the desired communication partner 1 becomes extremely large as compared with the case of using the beam steering. In this way, it is useful to perform the array reception using the null steering at the time of eliminating the interference signal.

Accordingly, the radio receiving apparatus of this embodiment performs the array reception using the null steering. In other words, the reception weight calculation section 203 shown in FIG. 2 calculates reception weights $W_1$ and $W_2$ by a control algorithm using, for example, MMSE (Minimum Means Square Error) as a code so as to obtain the null point.

However, reception weights $W_1$ and $W_2$ thus obtained are not the weights that adjust only the phases of the signals received by the respective antennas. Hence, in the case of performing the array reception using the null steering, replica signals $X_{r1}$ and $X_{r2}$ for every antenna cannot be generated by multiplying the signals subjected to provisional decision by complex conjugates of reception weights $W_1$ and $W_2$ as replica weights $W_{r1}$ and $W_{r2}$.

For this reason, according to this embodiment, the replica weight calculation section 211 shown in FIG. 2 calculates a replica weight $W_{rk}$ in the following way. Additionally, in this embodiment, since the number of array antennas is two, k is 1 or 2.

It is assumed that a signal subjected to provisional decision by the decider 209 is d, a steering vector of each antenna obtained by the arrival direction estimation section 204 is $S_k$ and a channel estimation value of a signal $X_k$ received by each antenna is h. The replica signal $X_{rk}$ can be expressed by, the following equation (1):

$$Xrk = dhSk \qquad (1)$$

Additionally, since it is assumed that fading correlation between the array antennas is 1, the channel estimation values of the signals received by the respective antennas are all h.

Moreover, it is assumed that the channel estimation value of the signal subjected to array combining obtained by the channel estimation section 206 is $h_a$ and a reception weight by which the signal $X_k$ received by each antenna is multiplied is $W_k$. The following equation is established.

$$dh_a = \sum_{k=1}^{n} X_{rk} W_k \qquad (2)$$

where n denotes the number of antenna.

Substitution of equation (1) into equation (2) yields the following equation (3):

$$dh_a = \sum_{k=1}^{n} dh S_k W_k \qquad (3)$$

From the equation (3), the following equation (4) is established:

$$h = \frac{h_a}{\sum_{k=1}^{n} S_k W_k} \qquad (4)$$

Next, substitution of equation (4) into equation (1) yields the following equation (5):

$$X_{rk} = \frac{dS_k h_a}{\sum_{k=1}^{n} S_k W_k} \qquad (5)$$

Moreover, the replica signal $X_{rk}$ can be expressed by the following equation (6):

$$Xrk = dhaWrk \qquad (6)$$

Then, comparison between equation (5) and (6) is performed and the following equation (7) can be obtained as a replica weight $W_{rk}$ by the replica weight calculation section 211.

$$W_{rk} = \frac{S_k}{\sum_{k=1}^{n} S_k W_k} \qquad (7)$$

Accordingly, the radio receiving apparatus of this embodiment can calculate the replica weight $W_{rk}$ without limitation of the kinds of the reception weights even if any kind of reception weight is used as a reception weight $W_k$.

Therefore, the radio receiving apparatus of this embodiment can generate the replica signal $X_{rk}$ every antenna even if the replica weight $W_{rk}$ is not the complex conjugate of the reception weight $W_k$. In other words, since the kind of reception weight used in the radio receiving apparatus of this embodiment is not limited to the in-phase addition weight, the radio receiving apparatus of this embodiment can perform the array reception using the null steering having high interference cancellation effect.

The above has explained the case in which the array reception is performed using the null steering as one example. The radio receiving apparatus of this embodiment can generate the replica signal even if any kind of reception weight is used, so that the method of the array reception is not limited to the null steering.

For example, in the case where the radio receiving apparatus of this embodiment performs the array reception using the beam steering, the arrival direction estimation section 204 outputs the steering vector $S_k$ to the reception weight calculation, section 203, and the reception weight calculation section 203 calculates the reception weight $W_k$ as a complex conjugate $S_k^*$ of the steering vector $S_k$.

Namely, $W_k$ in the above equation (7) is equal to $S_k^*$.

$$Wk=Sk^* \quad (8)$$

Accordingly, the replica weight calculation section 211 calculates the replica weight $W_{rk}$ using the above equation (7) to obtain the following equation (9):

$$Wrk=Sk \quad (9)$$

Accordingly, since the replica weight $W_{rk}$ serves as a complex conjugate of the reception weight $W_k$, the radio receiving apparatus of this embodiment can use the in-phase addition weight also as a reception weight $W_k$.

In this way, according to the radio receiving apparatus and the radio receiving method of this embodiment, the array reception is performed using the optimal directional control method in order to improve the interference cancellation effect without limiting to a calculation algorithm of the reception weight, and the replica signal can be generated every signal received by each antenna of the array antenna. This makes it possible to receive a desired signal with high quality in an apparatus of small scale even when the array antenna and the interference canceller are combined.

Moreover, according to the radio receiving apparatus and the radio receiving method of this embodiment, the reception weight can be updated in accordance with the change in the state of interference. This makes it possible to generate the radiation pattern and the replica signal accurately. Accordingly, according to the radio receiving apparatus and the radio receiving method of this embodiment, since the interference cancellation having good performance can be carried out with a relatively small number of stages, the apparatus scale can be reduced.

Still moreover, according to the radio receiving apparatus and the radio receiving method of this embodiment, since the accuracy of the estimation of the direction of arrival can be improved as the operation goes to the last stage, the accuracy of the calculation of the replica weight can be improved.

Embodiment 2

The radio receiving apparatus and the radio receiving method of this embodiment are to eliminate the interference signals sequentially every communication partner in one stage and to update the reception weights sequentially every communication partner in one stage.

Figure 6:
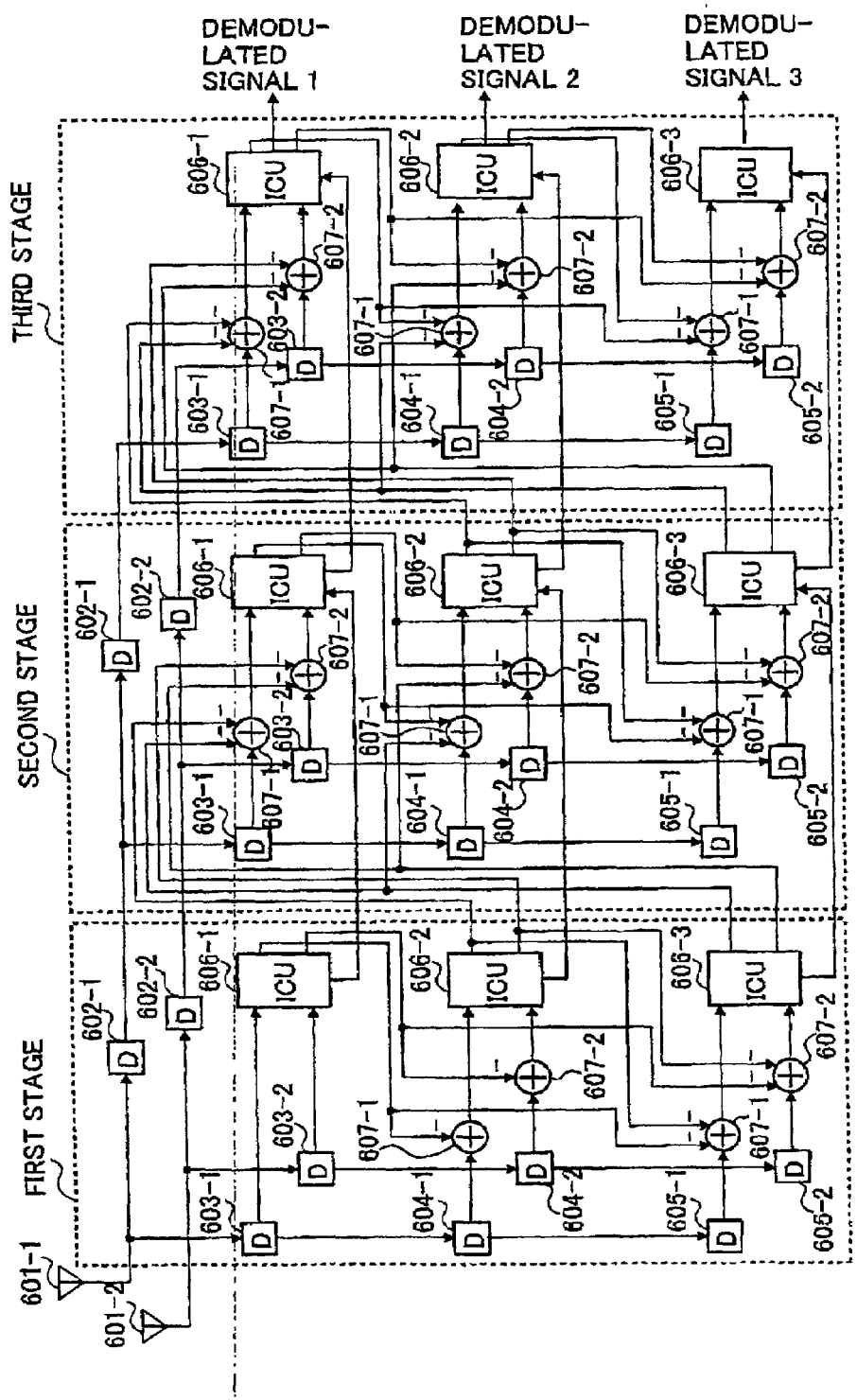
FIG. 6 is a block diagram of a main part illustrating a schematic configuration of a radio receiving apparatus according to Embodiment 2 of the present invention.

FIG. 6 is a block diagram of a main part illustrating a schematic configuration of a radio receiving apparatus according to Embodiment 2 of the present invention. Additionally, ICUs 606-1 to 606-3 shown in FIG. 6 have the same configuration as that of the ICU 102-1 shown in FIG. 2, and the detailed explanation of each ICU is omitted. It is noted that the ICU 606-1 and 606-2 of the third stage shown in FIG. 6 adopt the configuration that output the replica cignal and output demodulated signal 1 and 2, respectively. Also, the ICU 606-3 of the third stage shown in FIG. 6 adopts the same configuration as that of the ICU 106-1 shown in FIG. 3 so as to output a demodulated signal 3.

In addition, as illustrated in FIG. 6, since the first to third stages have the same configuration, the same reference numerals are added to the same structural parts, and the explanation of the second and third stages are omitted.

Signals received via antennas 601-1 and 601-2 are inputted to delayers 602-1, 602-2, and 603-1, 603-2, respectively. The received signals inputted to the delayers 602-1, 602-2 are delayed by a given time and outputted to the second stage. The received signals inputted to the delayers 603-1, 603-2 are delayed by a given time, and outputted to the ICU 606-1 and outputted to delayers 604-1 and 604-2.

In the ICU 606-1, a reception weight, a steering vector, and a replica signal of the communication partner 1 are generated every antenna based on the received signal. The replica signal of the communication partner 1 generated every antenna is inputted to each of adders 607-1 and 607-2, and the steering vector every antenna is inputted to the ICU 606-1 of the second stage.

In the adders 607-1 and 607-2 connected to the delayers 604-1, 604-2, the replica signals of the communication partner 1 are eliminated from the received signals delayed by the delayers 604-1, and 604-2.

In the ICU 606-2, a reception weight, a steering vector, and a replica signal of the communication partner 2 are generated every antenna based on a signal obtained by eliminating the replica signal of the communication partner 1 from the received signal. The replica signal of the communication partner 2 generated every antenna is inputted to each of next adders 607-1 and 607-2, and the steering vector every antenna is inputted to the ICU 606-2 of the second stage.

In the adders 607-1 and 607-2 connected to the delayers 605-1, 605-2, the replica signals of the communication partner 1 and those of the communication partner 2 are eliminated from the received signals delayed by the delayers 605-1, and 605-2.

Then, in the ICU 606-3, a reception weight, a steering vector, and a replica signal of the communication partner 3 are generated every antenna based on a signal obtained by eliminating the replica signal of the communication partner 1 and the replica signal of the communication partner 2 from the received signal.

In this way, since each ICU in one stage calculates the reception weight based on the signal from which the interference signals are sequentially eliminated, the reception weights are sequentially updated every communication partner in one stage.

An explanation will be next given of the radiation pattern generated by each ICU of the first stage using FIGS. 7A to 7C. FIG. 7A to FIG. 7C are view each showing an example of a radiation pattern formed by each ICU of the radio receiving apparatus according to Embodiment 2 of the present invention. In FIGS. 7A to 7C, it is assumed that the wider the width of the, arrow becomes, the larger transmission power becomes.

First, all signals sent from the communication partners 1 to 3 are contained in the signals inputted in the ICU 606-1. It is assumed that the ICU 606-1 performs the array reception using the null steering. In the ICU 606-1, as shown in FIG. 7A, the radiation pattern is generated in such a way that the null point is directed to the direction where the communication partner 2 exists. This makes it possible for the ICU 606-1 to generate the replica signal after eliminating interference received from the communication partner 2. As a result, the replica signal of the communication partner 1 can be accurately generated.

The reason why the null point is not directed to the direction where the communication partner 3 exists is as follows:

Since the number of antennas is two, the number of null points that can be generated is only one, with the result that the null point is formed in the direction where the communication partner 2 providing a large quality of interference exists.

Since the replica signal of the communication partner 1 is eliminated from the received signal by the adders 607-1 and 607-2 connected to the delayers 604-1 and 604-2, only the signals sent from the communication partners 2 and 3 are contained in the signals inputted to the ICU 606-2. Accordingly in the ICU 606-2, as illustrated in FIG. 7B, the radiation pattern is generated in such a way that the null point is directed to the direction where the communication partner 3 exists. This makes it possible for the ICU 606-2 to generate the replica signal after eliminating interference received from the communication partner 3 from the signals from which interference received from the communication partner 1 is eliminated. As a result, the replica signal of the communication partner 2 can be accurately generated.

Then, since the replica signals of the communication partners 1 and 2 are eliminated from the received signals by the adders 607-1 and 607-2 connected to the delayers 605-1 and 605-2, only the signal sent from the communication partner 3 is inputted to the ICU 606-3. Accordingly, in the ICU 606-3, as illustrated in FIG. 7C, the radiation pattern is generated in such a way that the beam point is directed to the direction where the communication partner 3 exists. This makes it possible to generate the replica signal of the communication partner 3 accurately.

Embodiment 1 has explained the radio receiving apparatus in which the array antenna and the parallel type interference canceller are combined. In the radio receiving apparatus of embodiment 1, the parallel type interference canceller is used, so that the inference signals of the respective communication partners are simultaneously eliminated in parallel in one stage. For this reason, in Embodiment 1, each ICU in one stage calculates the reception weights without considering the interference signals to be eliminated in the stage.

In contrast to this, the radio receiving apparatus of Embodiment 2 is the radio receiving apparatus in which the array antenna and the serial type interference canceller are combined as illustrated in FIG. 6. For this reason, in the radio receiving apparatus of this embodiment, the interference signals are sequentially eliminated for every communication partner in one stage. Accordingly, in the radio receiving apparatus of this embodiment, the signals from which interference signals are sequentially eliminated are inputted to each ICU in one stage.

In other words, each ICU of the radio receiving apparatus of this embodiment calculates the reception weights with respect to the signals from which the interference signals are sequentially eliminated it one stage. Hence, as compared with each ICU of the radio receiving apparatus of Embodiment 1, it is possible to calculate the reception weights with respect to the signals having a small amount of interference. Accordingly, the radio receiving apparatus of this embodiment can generate the radiation pattern and the replica signal more accurately as compared with Embodiment 1. This makes it possible to obtain high interference cancellation capability even if the number of stages is further reduced as compared with Embodiment 1. Therefore, it is possible to further reduce the apparatus scale.

Thus, according to the radio receiving apparatus and the radio receiving method according to this embodiment, the interference signals are sequentially eliminated every communication partner in one stage to update the reception weights sequentially every communication partner in one stage. This makes it possible to improve the accuracy of the radiation pattern and that of the replica signal, Therefore, according to the radio receiving apparatus and the radio receiving method according to this embodiment, it is possible to obtain high interference cancellation capability even if the number of stages is further reduced as compared with Embodiment 1, and this makes it possible to further reduce the apparatus scale.

Additionally, in Embodiments 1 and 2, the method for estimating the direction of arrival is not particularly limited. The estimation of the direction of arrival aims to obtain the steering vector $S_k$ every antenna. For this reason, the radio receiving apparatus of Embodiment 1 and 2 may obtain the steering vector $S_k$ using any method as long as the steering vector $S_k$ can be obtained. For example, the radio receiving apparatus of Embodiment 1 and 2 calculate the correlation value between the signal received by each antenna and the known signal to make it possible to obtain the steering vector $S_k$.

Embodiment 1 has explained the radio receiving apparatus in which the array antenna and the parallel type interference canceller are combined. Embodiment 2 has explained the radio receiving apparatus in which the array antenna and the serial type interference canceller are combined. However, the present invention can be applied to the radio receiving apparatus in which the array antenna and the symbol ranking type interference canceller are combined.

As explained above, according to the present invention, even it the array antenna and the a interference canceller are combined, it is possible to receive a desired signal with high quality in an apparatus of small scale without providing an interference canceller to each channel corresponding to each communication partner.

This application is based on the Japanese Patent Application No. 2000-010878 filed on Jan. 19, 2000, entire content of which is expressly incorporated by reference herein

INDUSTRIAL APPLICABILITY

The present invention is suitable for use in a mobile station apparatus and a base station apparatus in a mobile communication system. In the case of application, it is possible to receive a desired signal with high quality in an apparatus of small scale even if the array antenna and the interference canceller are combined in the mobile station apparatus and the base station apparatus.

What is claimed is:

1. A radio receiving apparatus comprising:
   a first calculator that calculates reception weighting factors $W_k$ for signals received respectively by a plurality of n antenna elements composing an adaptive array antenna;
   an arrival direction estimator that calculates steering vectors $S_k$ to estimate directions of arrival of the received signals;
   a second calculator that calculates weighting factors $W_{rk}$ for use in replica signal generation from the reception weighting factors $W_k$ and the steering vectors $S_k$;
   a replica signal generator that generates replica signals for the received signals using the weighting factors $W_k$; and an eliminator that eliminates components equivalent to the replica signals from the received signals, wherein the second calculator calculates the weighting factors $W_{rk}$ from the equation:

$$W_{rk} = S_k / \Sigma_{k=1}^{n} S_k \cdot W_k.$$

2. The radio receiving apparatus according to claim 1, wherein said first calculator calculates the reception weighting factors $W_k$, by which a radiation pattern is formed, in such a way that a null point is directed to a direction where an interference signal source exists.

3. The radio receiving apparatus according to claim 1, further comprising:
a plurality of processors that each comprise a first calculator, an arrival direction estimator and an eliminator, as defined in claim 1, wherein
each processor is one stage of a multistage device.

4. The radio receiving apparatus according to claim 3, wherein in the processor of a latter stage, the corresponding first calculator calculates the reception weighting factors for signals obtained by eliminating equivalent components to the replica signals generated in a preceding stage from signals received by the preceding stage.

5. The radio receiving apparatus according to claim 3, wherein in the processor of a latter stage, the corresponding arrival direction estimator estimates the directions of arrival of signals obtained by eliminating equivalent components to the replica signals generated in a preceding stage from signals received by the preceding stage.

6. The radio receiving apparatus according to claim 5, wherein in the processor of a latter stage, the corresponding arrival direction estimator estimates the directions of arrival of signals using an average value of calculated steering vectors in a given interval.

7. A mobile station apparatus comprising the radio receiving apparatus of claim 1.

8. A base station apparatus comprising the radio receiving apparatus of claim 1.

9. A radio receiving method comprising:
calculating reception weighting factors $W_k$ for signals received respectively by a plurality of n antenna elements composing an adaptive array antenna;
calculating steering vectors $S_k$ to estimate directions of arrival of the received signals;
calculating weighting factors $W_{rk}$ for use in replica signal generation from the reception weighting factors $W_k$ and the steering vectors $S_k$;
generating replica signals for the received signals using the weighting factors $W_k$; and
eliminating equivalent components to the replica signals from the received signals, wherein
the weighting factors $W_{rk}$ are calculated from the equation:

$$W_{rk} = \frac{S_k}{\sum_{k=1}^{n} S_k W_k}.$$

* * * * *